(12) United States Patent
Chen et al.

(10) Patent No.: US 10,247,870 B2
(45) Date of Patent: Apr. 2, 2019

(54) WEARABLE DISPLAY APPARATUS COMPRISING AN OPTICAL ASSEMBLY HAVING AN OPTICAL INTEGRATOR ROD

(71) Applicant: HIMAX DISPLAY, INC., Tainan (TW)

(72) Inventors: Kuan-Yu Chen, Tainan (TW); Yuet Wing Li, Tainan (TW)

(73) Assignee: HIMAX DISPLAY, INC., Tainan (TW)

( * ) Notice: Subject to any disclaimer, the term of this patent is extended or adjusted under 35 U.S.C. 154(b) by 375 days.

(21) Appl. No.: 14/851,685

(22) Filed: Sep. 11, 2015

(65) Prior Publication Data

US 2016/0327722 A1    Nov. 10, 2016

Related U.S. Application Data

(60) Provisional application No. 62/156,388, filed on May 4, 2015.

(51) Int. Cl.
*F21V 8/00* (2006.01)
*G02B 27/01* (2006.01)
(Continued)

(52) U.S. Cl.
CPC ......... *G02B 6/0028* (2013.01); *G02B 6/0016* (2013.01); *G02B 6/0025* (2013.01);
(Continued)

(58) Field of Classification Search
CPC ............. G02B 6/0028; G02B 27/1033; G02B 27/0994; G02B 6/0025; G02B 6/0116; G02B 27/0961; G02B 27/141
See application file for complete search history.

(56) References Cited

U.S. PATENT DOCUMENTS 5,341,231 A * 8/1994 Yamamoto ............. G02B 6/003
                                                    349/63
5,808,708 A * 9/1998 Oyama ................. G02B 6/0018
                                                    349/62
(Continued)

FOREIGN PATENT DOCUMENTS

CN    103389592 A    11/2013
JP    2000-162981 A    6/2000
(Continued)

OTHER PUBLICATIONS

Letter dated Aug. 16, 2017 from the KR agent transmitting the Aug 7, 2017 KR Office Action in co-pending KR Application No. 10-2016-0038358, analyzing the references cited therein.
(Continued)

*Primary Examiner* — Paul C Lee
(74) *Attorney, Agent, or Firm* — Baker & McKenzie LLP (57) ABSTRACT

A wearable display apparatus includes a reflective light modulator having a front, a light guide plate placed at the front of the light modulator, a plurality of monochromatic light sources of different colors, and an optical assembly. The light guide plate has a first and a second major surface opposite to each other, and a light incidence surface connected with the first and second major surfaces, the light guide plate directing light received at the light incidence surface through the first major surface toward the light modulator. The monochromatic light sources are operable to emit light of different colors in a sequential manner. The optical assembly is arranged adjacent to the light incidence surface of the light guide plate, and is configured to homogenize and distribute the light emitted by each of the monochromatic light sources across the light incidence surface.

15 Claims, 11 Drawing Sheets

(51) Int. Cl.
*G02B 27/09* (2006.01)
*G02B 27/10* (2006.01)
*G02B 27/14* (2006.01)

(52) U.S. Cl.
CPC ....... *G02B 6/0068* (2013.01); *G02B 27/0172* (2013.01); *G02B 27/1033* (2013.01); *G02B 6/0073* (2013.01); *G02B 27/0961* (2013.01); *G02B 27/0994* (2013.01); *G02B 27/141* (2013.01)

(56) References Cited

U.S. PATENT DOCUMENTS

| | | | | |
|---|---|---|---|---|
| 6,930,737 | B2* | 8/2005 | Weindorf | G02B 6/0023 |
| | | | | 349/60 |
| 6,951,401 | B2 | 10/2005 | Van Hees et al. | |
| 2002/0130985 | A1* | 9/2002 | Weindorf | G02B 6/0068 |
| | | | | 349/61 |
| 2002/0135572 | A1* | 9/2002 | Weindorf | G02B 6/0068 |
| | | | | 345/204 |
| 2002/0176035 | A1 | 11/2002 | Yamazaki | |
| 2003/0048628 | A1 | 3/2003 | Lee et al. | |
| 2009/0262283 | A1* | 10/2009 | Olson | G02B 6/002 |
| | | | | 349/65 |
| 2013/0147685 | A1 | 6/2013 | Gupta | |
| 2013/0235611 | A1* | 9/2013 | Franklin | G09F 13/04 |
| | | | | 362/602 |

FOREIGN PATENT DOCUMENTS

| | | | |
|---|---|---|---|
| JP | 2007-047811 | A | 2/2007 |
| JP | 2007047811 | A * | 2/2007 |
| JP | 2007328336 | A | 12/2007 |
| JP | 2009-258731 | A | 5/2009 |
| JP | 2009117348 | A | 5/2009 |
| JP | 2012163662 | A | 8/2012 |
| JP | 2013109508 | A | 6/2013 |
| TW | 426771 | U1 | 4/2012 |
| WO | 2007081707 | A2 | 7/2007 |
| WO | 2007138501 | A1 | 12/2007 |
| WO | 2014209431 | A1 | 12/2014 |

OTHER PUBLICATIONS

KR Office Action dated Aug. 7, 2017, issued in co-pending KR Application No. 10-2016-9938358.
2nd Official Action dated Apr. 23, 2018 in Co-Pending KR Patent Applicatio No. 10-2016-0038358.
Letter dated May 8, 2018 from KR agent transmitting and explainging 2nd Official Action in Co-Pending KR Patent Application No. 10-2016-0038358.
Office Action dated Jul. 25, 2016 in co-pending TW Patent Application No. 104136085.
A translation of the Abstract of CN 103389592 A.
Office Action dated Sep. 30, 2016 and cited references in corresponding EP Patent Application No. 16158098.0-1562.
Office Action dated Dec. 13, 2016 and cited references in corresponding JP Patent Application No. 2015-230565.

* cited by examiner

20# WEARABLE DISPLAY APPARATUS COMPRISING AN OPTICAL ASSEMBLY HAVING AN OPTICAL INTEGRATOR ROD

CROSS-REFERENCE TO RELATED APPLICATION(S)

This patent application claims priority to U.S. Provisional Patent Application No. 62/156,388 filed on May 4, 2015, the disclosure of which is incorporated herein by reference.

BACKGROUND

1. Field of the Invention

The present invention relates to wearable display apparatuses.

2. Description of the Related Art

Microdisplays such as the ones used in head-mounted systems generally include a liquid crystal panel, and an illuminating device that irradiates light onto the liquid crystal panel. The liquid crystal panel can modulate the incident light to produce an image, which is then transferred through optics for display to the user's eye.

According to one known approach, the microdisplay can form a color image by using white light that illuminates color filters provided on the liquid crystal panel. However, this approach requires at least 3 color filtered sub-pixels per pixel, and thus is generally at least 3 times larger in size. As a result, microdisplays using color filters generally require larger optics, and display poor color quality due to electrical interaction between the color filtered sub-pixels.

Another known approach consists in using a field sequential color display technique to provide improved display performance and reduce the size of the microdisplay. According to the field sequential color display, a color image is divided into color fields based on the primary colors of red, green, and blue. As each color field is individually imaged by the microdisplay, the corresponding color light source is turned on. When these color fields are displayed in rapid sequence, a full color image can be perceived by a user. Because field sequential color display requires using multiple light sources (i.e., of different colors) that are spatially distinct, one encountered problem is that the illuminating light may not be uniformly distributed, i.e., the spatial distribution of each color light illuminating the light modulator may differ owing to the different location of the corresponding light source.

Therefore, there is a need for an improved wearable display apparatus that can address at least the foregoing issues.

SUMMARY

The present application describes a wearable display apparatus that can have reduced dimensions, and use multiple point-like monochromatic light sources of different colors to illuminate a light modulator.

In one embodiment, the wearable display apparatus includes a reflective light modulator having a front, a light guide plate placed at the front of the light modulator, a plurality of monochromatic light sources of different colors, and an optical assembly. The light guide plate has a first and a second major surface opposite to each other, and a light incidence surface respectively connected with the first and second major surfaces, the light guide plate being configured to direct light received at the light incidence surface through the first major surface toward the light modulator for modulation. The monochromatic light sources are operable to emit light of the different colors in a sequential manner. The optical assembly is arranged adjacent to the light incidence surface of the light guide plate, and is configured to homogenize and distribute the light emitted by each of the monochromatic light sources across the light incidence surface.

DETAILED DESCRIPTION OF THE EMBODIMENTS

Figure 1:
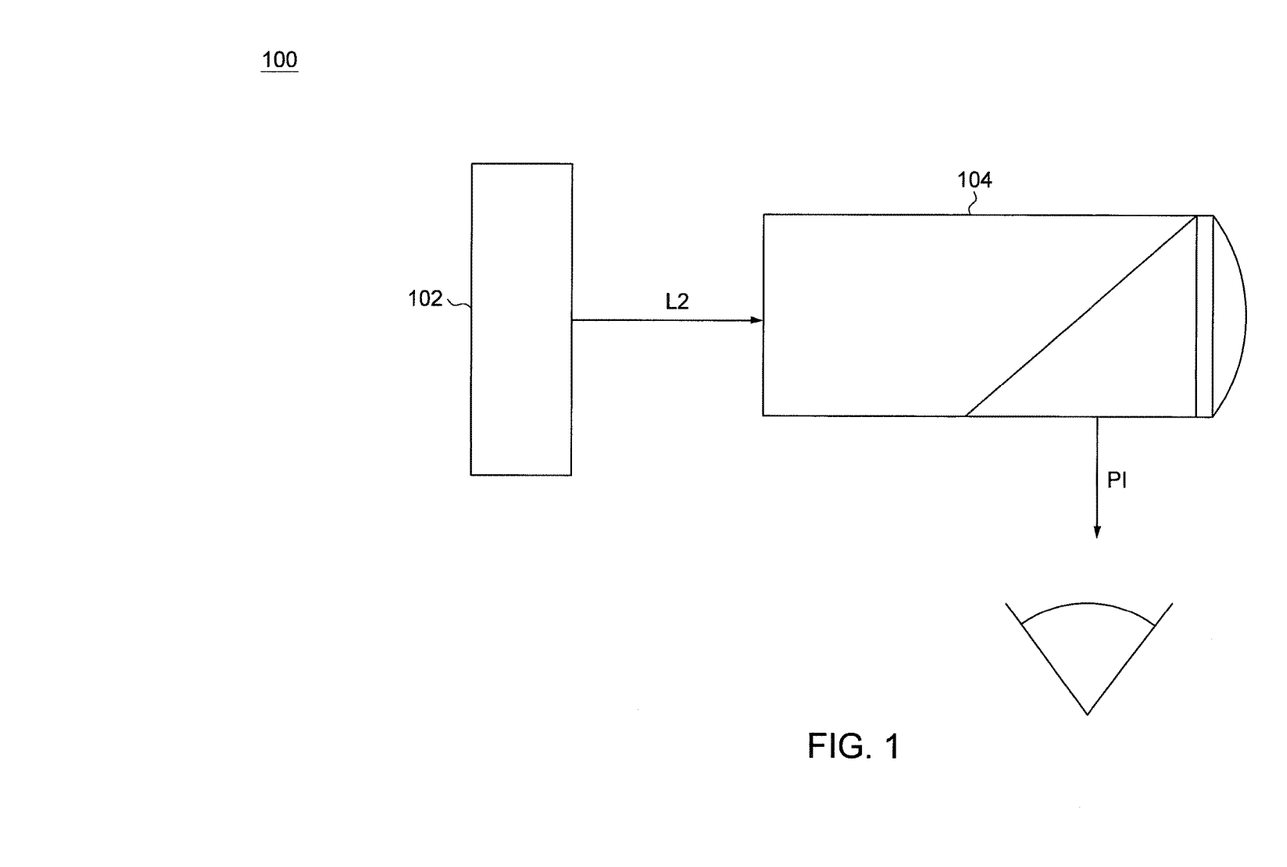
FIG. 1 is a simplified schematic view illustrating an embodiment of a wearable display apparatus.

FIG. 1 is a simplified schematic view illustrating an embodiment of a wearable display apparatus 100 that may be implemented in portable systems such as head-mounted systems for near-eye display. The wearable display apparatus 100 can include an imaging part 102 and an optical module 104. The imaging part 102 can generate an image light L2 based on received data, and the optical module 104 can collect rays of the image light and form a projected image PI with uniform illumination for display to a user's eye. For example, the optical module 104 can include a projection lens, a field lens, a beam splitter, a prism, a reflective element, and the like.

Figure 2:
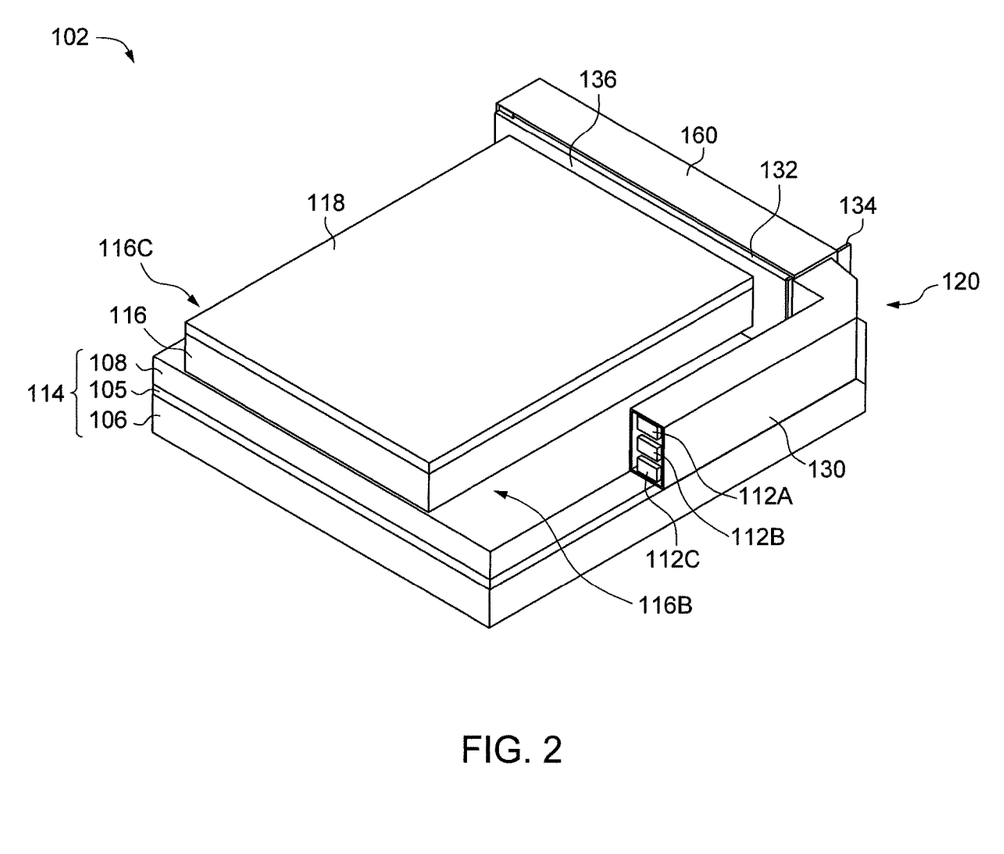
FIG. 2 is a simplified schematic view illustrating exemplary construction of an imaging part implemented in a wearable display apparatus.
Figure 3:
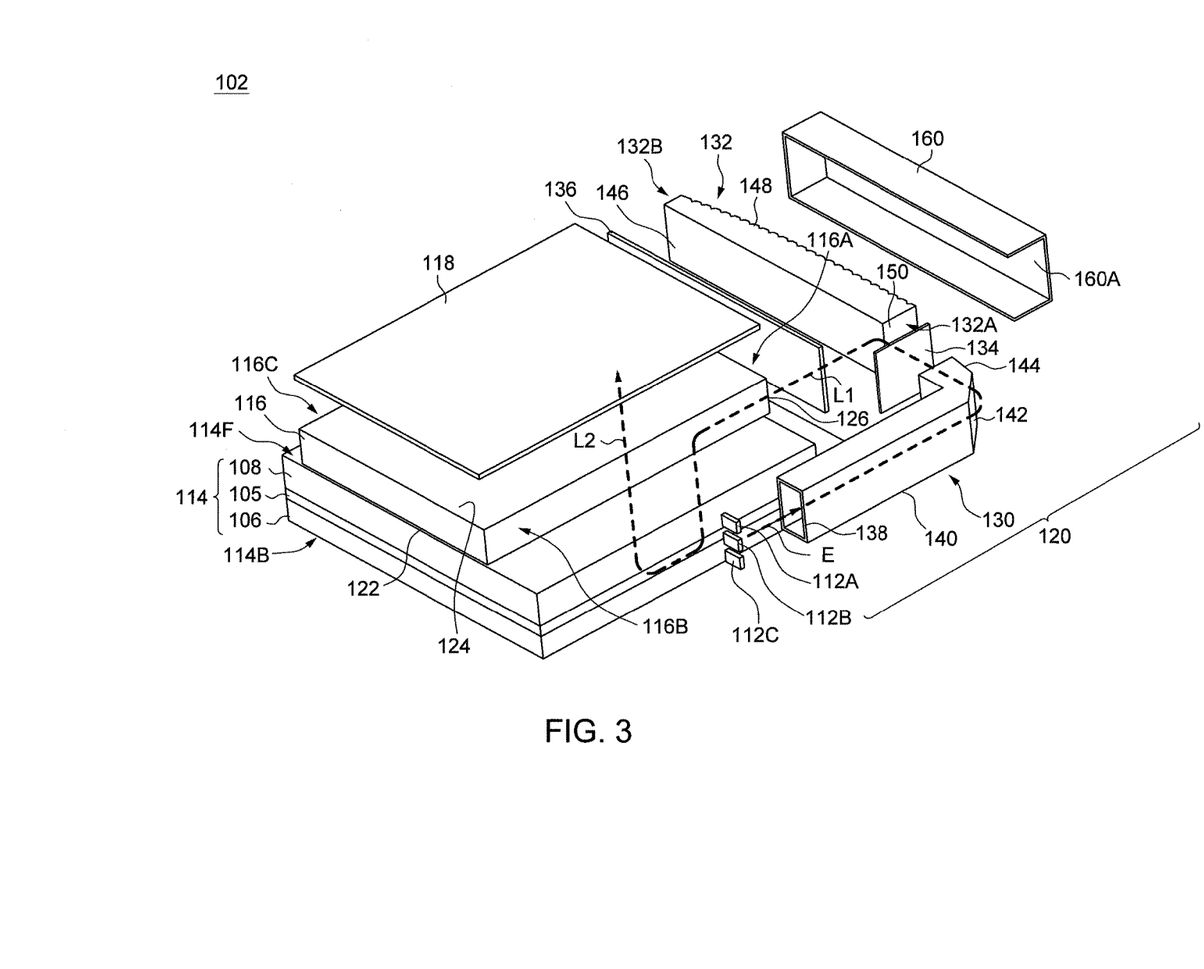
FIG. 3 is an exploded view illustrating the structure of the imaging part shown in FIG. 2.

FIG. 2 is a simplified schematic view illustrating exemplary construction of the imaging part 102 in the wearable display apparatus 100, and FIG. 3 is an exploded view illustrating the structure of the imaging part 102 shown in FIG. 2. Referring to FIGS. 2 and 3, the imaging part 102 includes a set of multiple monochromatic light sources 112A, 112B and 112C, a reflective-type light modulator 114, a light guide plate 116, a polarizer 118, and an optical assembly 120 for conveying light emitted from the monochromatic light sources 112A, 112B and 112C to the light guide plate 116.

Each of the monochromatic light sources 112A, 112B and 112C can emit an illuminating light of a different color. In one embodiment, the monochromatic light sources 112A, 112B and 112C can be exemplary red, green and blue light-emitting diodes. One will appreciate, however, that the monochromatic light sources 112A, 112B and 112C may include monochromatic light sources of other colors. In one embodiment a field sequential color display may be applied, and the monochromatic light sources 112A, 112B and 112C can be operable to emit light of different colors (e.g., red, green and blue) in a sequential manner. The monochromatic light emitted by each of the monochromatic light sources 112A, 112B and 112C can be used to illuminate the light modulator 114 so as to form an individual color image. As the monochromatic light sources 112A, 112B and 112C are activated in a rapid sequence, the display of these color images can be perceived by a human observer as a full color image.

Referring to FIGS. 2 and 3, the light modulator 114 has a front 114F and a back 114B. In one embodiment, the light modulator 114 can be a liquid crystal on silicon (LCOS) panel, which can include a liquid crystal 105 sandwiched between a silicon substrate 106 and a transparent substrate 108. The silicon substrate 106 can be formed with a driving circuit, and an array of pixel electrodes electrically connected with the driving circuit. According to the received image data, the light modulator 114 can modulate the polarization state of an illuminating light L1 received at the front 114F so as to form an image light L2 conveying a rendered image, and then reflect the image light L2 toward the front 114F for display. In one embodiment, the light modulator 114 may be a microdisplay, which may be particularly suitable for wearable devices.

The light guide plate 116 can be made of glass, or a transparent resin such as acrylic resin, polycarbonate resin, polymethyl methacrylate (PMMA), and the like, especially low birefringence material. The light guide plate 116 is a planar guide having two major surfaces 122 and 124 opposite to each other, and a light incidence surface 126 respectively connected with the two major surfaces 122 and 124. The light incidence surface 126 extends along a side 116A of the light guide plate 116, and is delimited between two opposite sides 116B and 116C of the light guide plate 116 that are contiguous to the side 116A. The light guide plate 116 is placed at the front 114F of the light modulator 114 at a location between the light modulator 116 and the polarizer 118, the two major surfaces 122 and 124 being respectively oriented toward the light modulator 114 and the polarizer 118. The light guide plate 116 can receive the illuminating light L1 at the light incidence surface 126, propagate the illuminating light L1 in a plane parallel to the light modulator 114, and redirect the illuminating light L1 through the major surface 122 toward the light modulator 114 for modulation. Moreover, the light guide plate 116 can receive the image light L2 outputted from the light modulator 114 at the major surface 122, and transmit the image light L2 through the major surface 124 toward the polarizer 118.

The polarizer 118 can be of a reflective type, i.e., it can transmit a part of the modulated image light L2 that has one polarization state (e.g., p-polarized part), and reflect a part of the image light that has another polarization state (e.g., s-polarized part). Alternatively, the polarizer 118 can be of an absorption type, i.e., it can transmit a part of the modulated image light that has one polarization state (e.g., p-polarized part), and absorb a part of the image light that has the other polarization state (e.g., s-polarized part). The portion of light exiting the polarizer 118 can travel toward the optical module 104 shown in FIG. 1.

Referring to FIGS. 2 and 3, the optical assembly 120 is placed adjacent to the light incidence surface 126 of the light guide plate 116. The optical assembly 120 can homogenize the monochromatic light emitted by each of the monochromatic light sources 112A, 112B and 112C, and distribute homogenized light as the illuminating light L1 across the light incidence surface 126 of the light guide plate 116. In one embodiment, the optical assembly 120 can include an optical integrator rod 130, a light guide member 132, a diffusing sheet 134 arranged between the optical integrator rod 130 and the light guide member 132, and a polarizer 136 arranged between the light guide member 132 and the light incidence surface 126 of the light guide plate 116.

Figure 4:
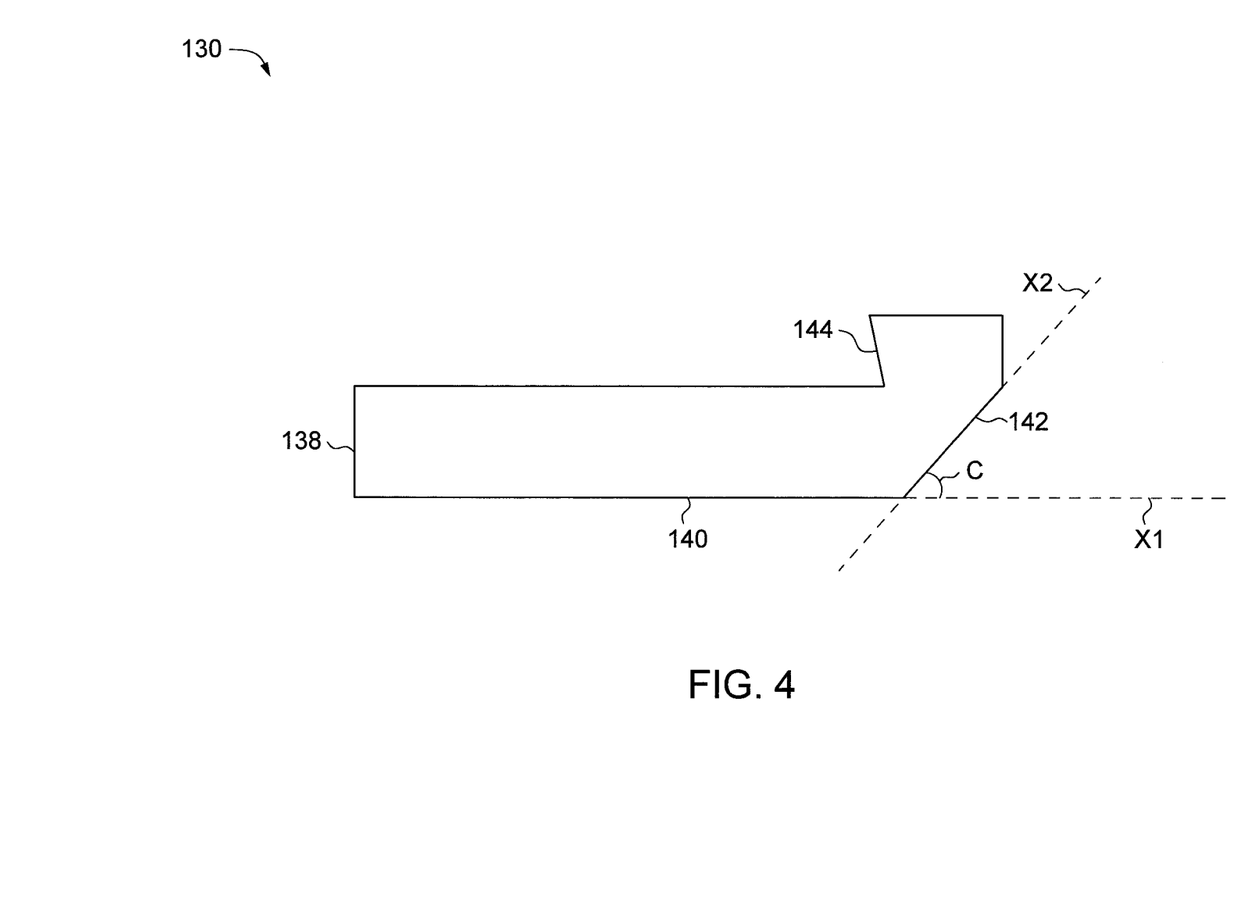
FIG. 4 is a schematic view illustrating an optical integrator rod used in the imaging part shown in FIG. 2.

In conjunction with FIGS. 2 and 3, FIG. 4 is a schematic view illustrating the optical integrator rod 130 alone. Referring to FIGS. 2-4, the optical integrator rod 130 can generally extend along the side 116B of the light guide plate 116 that is contiguous to the side 116A where is located the light incidence surface 126 of the light guide plate 116. The optical integrator rod 130 can have a light entrance window 138, an elongated portion 140, a turn portion 142 and a light exit window 144. An interior of the optical integrator rod 130 has a plurality of reflective sidewalls, so that light from any of the monochromatic light sources 112A, 112B and 112C can undergo internal reflection while propagating through the optical integrator rod 130.

Figure 5:
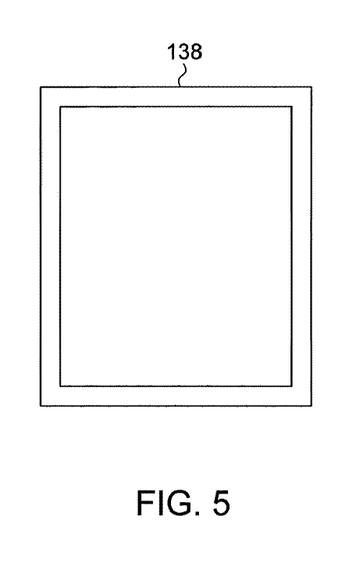
FIG. 5 is a schematic view illustrating a cross-section of a light entrance window of the optical integrator rod.

The light entrance window 138 of the optical integrator rod 130 is defined at an end of the elongated portion 140, and is located adjacent to the monochromatic light sources 112A, 112B and 112C. The cross-section of the light entrance window 138 can have any desirable shape. FIG. 5 illustrates one embodiment where the light entrance window 138 exemplary has a rectangular cross-section. However, it will be appreciated that the light entrance window 138 is not limited to rectangular cross-sections, and other cross-sectional shapes may be suitable.

The elongated portion 140 of the optical integrator rod 130 extends generally along an axis X1, and is connected with the turn portion 142 at a side opposite to the light entrance window 138. The turn portion 142 can extend along an axis X2 tilted an angle C relative to the axis X1 of the elongated portion 140 for directing light toward the light exit window 144 arranged on a lateral side of the elongated portion 140. In one embodiment, the angle C of the turn portion 142 may be between about 40 degrees and about 50 degrees, e.g., about 45 degrees.

Figure 6:
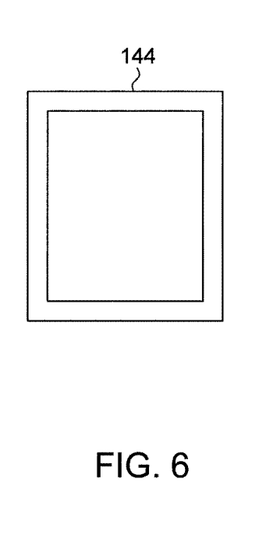
FIGS. 6 and 7 are schematic views illustrating exemplary cross-sections of a light exit window of the optical integrator rod.
Figure 7:
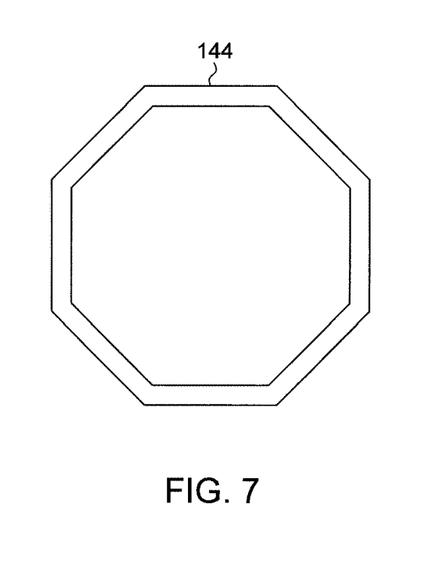

The light exit window 144 of the optical integrator rod 130 is connected with the turn portion 142, and opens on a side of the elongated portion 140 at a location distant from the light entrance window 138 along the axis X1. As shown in FIGS. 3 and 4, the light exit window 144 may sideways protrude from the elongated portion 140 for guiding light propagation out of the optical integrator rod 130 toward the light guide member 132. The cross-section of the light exit window 144 can have a shape that is similar or different from that of the light entrance window 138. For example, FIG. 6 illustrates an embodiment where the cross-section of the light exit window 144 has a rectangular shape, and FIG. 7 illustrates another embodiment where the cross-section of the light exit window 144 has a polygonal shape (e.g., octagonal) different from that of the light entrance window 138.

Figure 8:
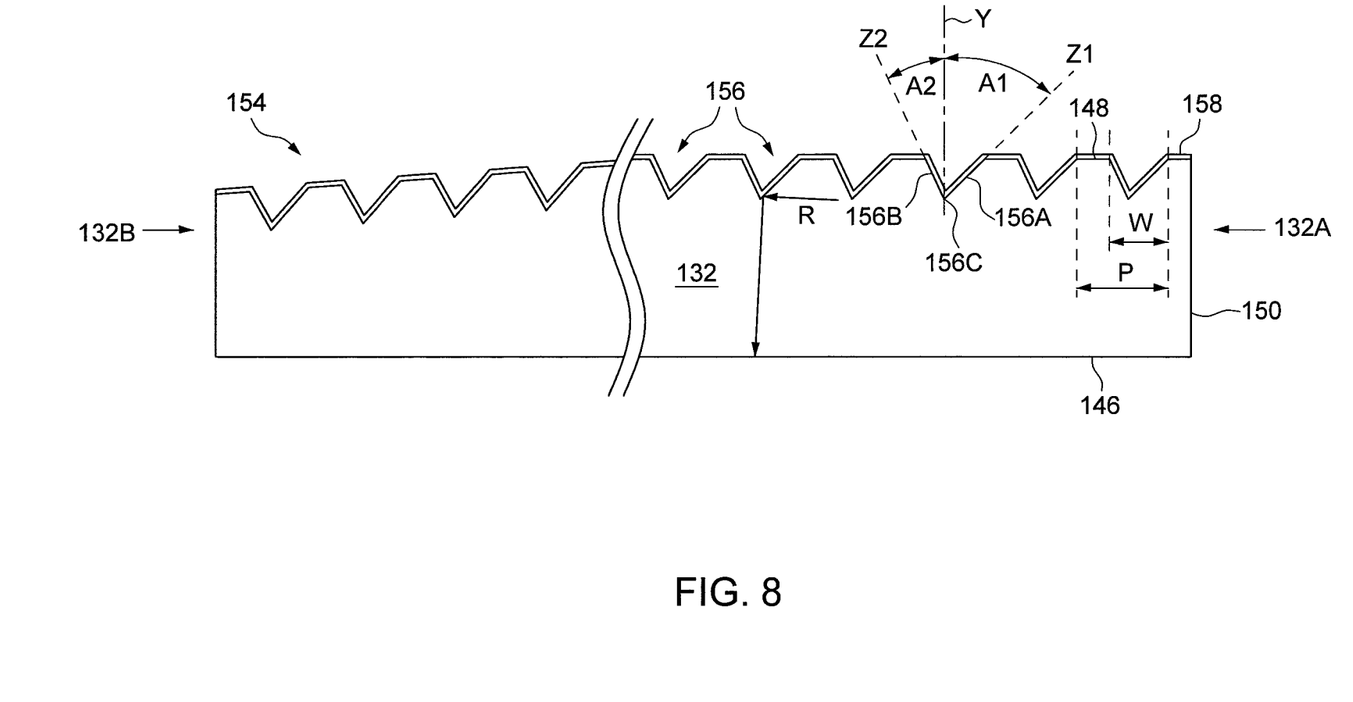
FIG. 8 is a schematic view illustrating a light guide member used in the imaging part shown in FIG. 2.

In conjunction with FIGS. 2 and 3, FIG. 8 is a schematic view illustrating the light guide member 132 alone. Referring to FIGS. 2, 3 and 8, the light guide member 132 can be arranged along the light incidence surface 126 of the light guide plate 116 between the two opposing sides 116B and 116C of the light guide plate 116. The light guide member 132 can have a refractive index between 1.52 and 2.2. Examples of suitable materials for making the light guide member 132 can include, without limitation, glass, or a transparent resin such as acrylic resin, polycarbonate resin and polymethyl methacrylate (PMMA). The light guide member 132 can have two major surfaces 146 and 148 opposite to each other, and a light entering surface 150 respectively connected with the two major surfaces 146 and 148 at an end 132A of the light guide member 132. The light guide member 132 is placed such that the major surface 146 is oriented toward and positioned near the light incidence surface 126 of the light guide plate 116, and the light entering surface 150 is oriented toward and positioned near the light exit window 144 of the optical integrator rod 130.

Referring to FIGS. 3 and 8, the light guide member 132 further includes a plurality of optical structures 154 distributed along a length of the light guide member 132 extending from the end 132A to the end 132B thereof. The optical structures 154 are configured to reflect and redirect light traveling through the light guide member 132 toward the major surface 146 thereof. In one embodiment, the optical structures 154 can be grooves 156 formed on the major surface 148 of the light guide member 132. Each of the grooves 156 can have a V-like shape which is defined by two inclined sidewalls 156A and 156B that intersect with each other at a bottom end 156C of the groove 156. Each groove 156 can have a reference axis Y defined as the axis that is orthogonal to the plane of the major surface 144 and passes by the bottom end 156C of the groove 156. The two sidewalls 156A and 156B are substantially planar and extend at two sides of the reference axis Y respectively along two directions Z1 and Z2, the sidewall 156A being oriented toward the light entering surface 150, and the sidewall 156B being oriented toward the other end 132B of the light guide member 132 opposite to the light entering surface 150.

Each of the grooves 156 has an asymmetric shape, i.e., an angle A1 (not equal to 0) between the sidewall 156A and the reference axis Y differs from an angle A2 (not equal to 0) between the sidewall 156B and the reference axis Y. More specifically, the angle A1 between the sidewall 156A and the reference axis Y can range from about 30 to about 65 degrees, more preferably between 40 and 50 degrees. The angle A2 between the sidewall 156B and the reference axis Y is smaller than the angle A1, and can range from about 0 to about 30 degrees, more preferably between 0 and 15 degrees.

Moreover, a greatest width W of each groove 156 taken between the two sidewalls 156A and 156B is at least equal to 0.1 micrometers, and a groove period P between two neighboring grooves 156 is less than 100 micrometers. More preferably, the greatest width W of each groove 156 can be between 1 and 100 micrometers, and the period P can be between 1 and 100 micrometers, the period P being greater than the greatest width W. The groove period P may be constant or vary from the end 132A to the end 132B of the light guide member 132.

Referring to FIG. 8, a multilayer film coating 158 comprised of dielectric or metal layers can be applied on the sidewalls 156A and 156B of the grooves 156. Examples of layers composing the multilayer film coating 158 can include TiO2, Ta2O5, Ti3O5, Al2O3, SiO2, MgO, and the like. Moreover, the thickness of each layer in the multilayer film coating 150 can be between 5 nanometers and 5000 nanometers. The multilayer film coating 158 can promote polarization selection when light traveling through the light guide member 132 reflects on the sidewalls 156A and 156B.

In certain embodiment, the light guide member 132 can also have a shape that tapers toward the end 132B opposite to the end 132A where is located the light entering surface 150, i.e., the thickness of the light guide member 132 defined between the two opposite major surfaces 146 and 148 is smaller near the end 132B than near the end 132A. The tapered shape may facilitate light propagation at an end region of the light guide member 132 that is remote from the light entering surface 150.

The light guide member 132 as described herein can receive light at the light entering surface 150, and redirect the light to travel through the major surface 146 toward the light incidence surface 126 of the light guide plate 116 (as schematically shown with arrow R). To prevent light loss, a cover 160 having at least one reflective sidewall 160A can enclose the light guide member 132, the reflective sidewall 160A being arranged adjacent to the major surface 148 of the light guide member 132.

Referring again to FIGS. 2 and 3, the diffusing sheet 134 is interposed between the light exit window 144 of the optical integrator rod 130 and the light entering surface 150 of the light guide member 132. The diffusing sheet 134 can add angular homogenization, which can reduce color dependence of the light angle entering the light guide member 132.

Referring to FIG. 3, the polarizer 136 is arranged between the first major surface 146 of the light guide member 132 and the light incidence surface 116C of the light guide plate 116. In one embodiment, the polarizer 136 may be a reflective polarizer. Light emitted by any of the monochromatic light sources 112A, 112B and 112C may be randomly polarized light, and the polarizer 136 can convert the light exiting the major surface 146 of the light guide member 132 into the illumination light L1 of s-polarization state before it travels through the light incidence surface 126 into the light guide plate 116.

As shown in FIG. 3, during operation, light emitted from each of the monochromatic light sources 112A, 112B and 112C can propagate along a light path E that sequentially travels through the optical integrator rod 130, the diffusing sheet 134, the light guide member 132, the polarizer 136, and then enters the light guide plate 116 through the light incidence surface 126. In the light path E, the optical integrator rod 130 can spatially homogenize the light emitted from the separated point-like light sources formed by the monochromatic light sources 112A, 112B and 112C, and the diffusing sheet 134 can add angular homogenization of the light emitted from these light sources. The light guide member 132 then can distribute the homogenized light uniformly along the light incidence surface 126 of the light guide plate 116 as the illuminating light L1. Accordingly, the optical assembly 120 can ensure that light outputted by each of the monochromatic light sources 112A, 112B and 112C is delivered to the light guide plate 116 according to a uniform distribution that does not vary according to the locations of the monochromatic light sources 112A, 112B and 112C.

Figure 9:
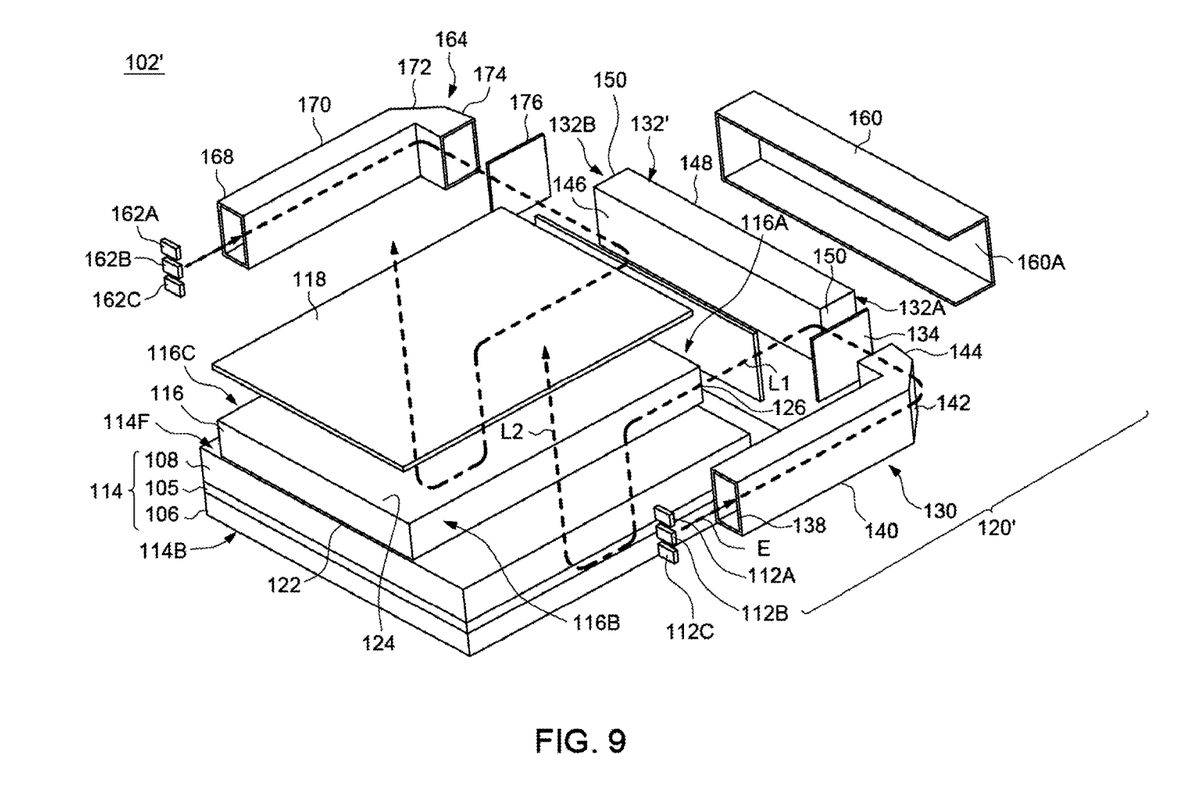
FIG. 9 is a schematic view illustrating a variant embodiment of an imaging part in which two sets of monochromatic light sources are respectively provided at two opposite sides of a light guide plate.

While the aforementioned embodiment of the imaging part 102 provides one set of multiple monochromatic light sources 112A, 112B and 112C arranged at the side 116B of the light guide plate 116, it may be possible to add another set of multiple monochromatic light sources at the other side 116C of the light guide plate 116 to increase light brightness delivered at the light incidence surface 126. FIG. 9 is a schematic view illustrating a variant embodiment of an imaging part 102' in which two sets of monochromatic light sources are respectively provided at the two sides 116B and 116C of the light guide plate 116. Referring to FIG. 9, in addition to the monochromatic light sources 112A, 112B and 112C arranged at the side 116B of the light guide plate 116 as described previously, the imaging part 102' further includes another set of multiple monochromatic light sources 162A, 162B and 162C at the opposite side 116C of the light guide plate 116. In addition to the optical integrator 130 associated with the monochromatic light sources 112A, 112B and 112C described previously, the optical assembly 120' of the imaging part 102' includes another optical integrator rod 164 arranged along the side 116C of the light guide plate 116 in association with the additional monochromatic light sources 162A, 162B and 162C. Moreover, the optical assembly 120' also includes a light guide member 132' that replaces for the light guide member 132 (shown in FIG. 3) described previously, the light guide member 132' being configured to cooperate with the two optical integrator rods 130 and 164.

The added optical integrator rod 164 can be similar in construction to the optical integrator rod 130 described previously, which is associated with the monochromatic light sources 112A, 112B and 112C arranged at the side 116B of the light guide plate 116. Like the optical integrator rod 130, the optical integrator rod 164 can have a light entrance window 168, an elongated portion 170, a turn portion 172 and a light exit window 174. The monochromatic light sources 162A, 162B and 162C are arranged adjacent to the light entrance window 168 of the optical integrator rod 164, and the light exit window 174 of the optical integrator rod 164 is oriented toward the end 132B of the light guide member 132'. Like previously described, a diffusing sheet 176 may be interposed between the light exit window 174 of the optical integrator rod 164 and the light entering surface 150 at the end 132B of the light guide member 132'.

Figure 10:
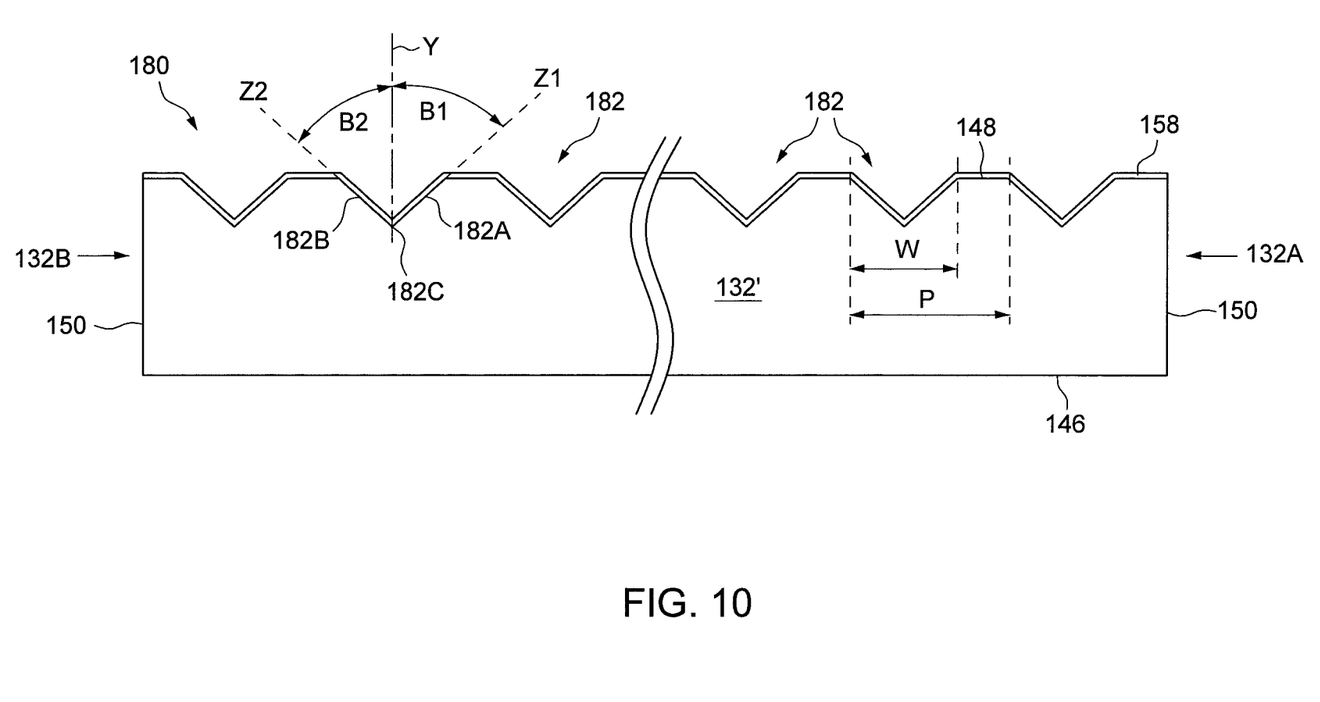
FIG. 10 is a schematic view illustrating a light guide member used in the imaging part shown in FIG. 9.

In conjunction with FIG. 9, FIG. 10 is a schematic view illustrating the light guide member 132' of the optical assembly 120'. Referring to FIGS. 9 and 10, the light guide member 132' has the two major surfaces 146 and 148 opposite to each other, and two light entering surfaces 150 that are respectively defined at the two opposite ends 132A and 132B of the light guide member 132' and are respectively connected with the two major surfaces 146 and 148. The light guide member 132' is placed such that the major surface 146 is positioned near the light incidence surface 126 of the light guide plate 116 and the two light entering surfaces 150 are respectively positioned near the light exit window 144 of the optical integrator rod 130 and the light exit window 174 of the optical integrator rod 164.

Referring to FIG. 10, the light guide member 132' further includes a plurality of optical structures 180 distributed along the length of the light guide member 132' extending from the end 132A to the end 132B thereof. The optical structures 180 are configured to redirect light entering the light guide member 132' at the two ends 132A and 132B thereof toward the major surface 146 by optical reflection. In one embodiment, the optical structures 180 can be grooves 182 formed on the major surface 148 of the light guide member 132'. Each of the grooves 182 can have a V-like shape which is defined by two inclined sidewalls 182A and 182B that intersect with each other at a bottom end 182C of the groove 182. Each groove 182 can have a reference axis Y defined as the axis that is orthogonal to the plane of the major surface 144 and passes by the bottom end 182C of the groove 182. The two sidewalls 182A and 182B are substantially planar and extend at two sides of the reference axis R respectively along two directions Z1 and Z2.

Each of the grooves 182 has a symmetric shape, i.e., an angle B1 (not equal to 0) between the sidewall 182A and the reference axis Y is substantially equal to an angle B2 (not equal to 0) between the sidewall 182B and the reference axis Y. Each of the angles B1 and B2 can range from about 30 to about 65 degrees, more preferably between 40 and 50 degrees.

Moreover, a greatest width W of each groove 182 taken between the two sidewalls 182A and 182B is at least equal to 0.1 micrometers, and a groove period P between two neighboring grooves 182 is less than 100 micrometers. More preferably, the greatest width W of each groove 182 can be between 1 and 100 micrometers, and the period P can be between 1 and 100 micrometers, the groove period P being greater than the greatest width W. The groove period P may be constant from the end 132A to the end 132B of the light guide member 132'.

Like previously described, the light guide member 132' can have a multilayer film coating 158 comprised of dielectric or metal layers deposited on the sidewalls 182A and 182B of the grooves 182. Examples of layers composing the multilayer film coating 158 can include $TiO_2$, $Ta_2O_5$, $Ti_3O_5$, $Al_2O_3$, $SiO_2$, MgO, and the like. Moreover, the thickness of each layer in the multilayer film coating 150 can be between 5 nanometers and 5000 nanometers.

With the optical assembly 120', light emitted from each of the monochromatic light sources 112A, 112B and 112C travels through the optical integrator rod 130 and the diffusing sheet 134 and is redirected by the light guide member 132 toward the light incidence surface 126 of the light guide plate 116. Likewise, light emitted from each of the monochromatic light sources 162A, 162B and 162C travels through the optical integrator rod 164 and the diffusing sheet 176 and is redirected by the light guide member 132' toward the light incidence surface 126 of the light guide plate 116. Accordingly, the illuminating light delivered to the light incidence surface 126 of the light guide plate 116 can have uniform and increased brightness.

While the aforementioned optical assemblies 120 and 120' use optical integrator rods associated with a light guide member, other constructions of optical assemblies may be possible for delivering light emitted from the monochromatic light sources to the light incidence surface 126 of the light guide plate 116 in a uniform manner. Some other examples of optical assemblies are illustrated in FIGS. 11-13.

Figure 11:
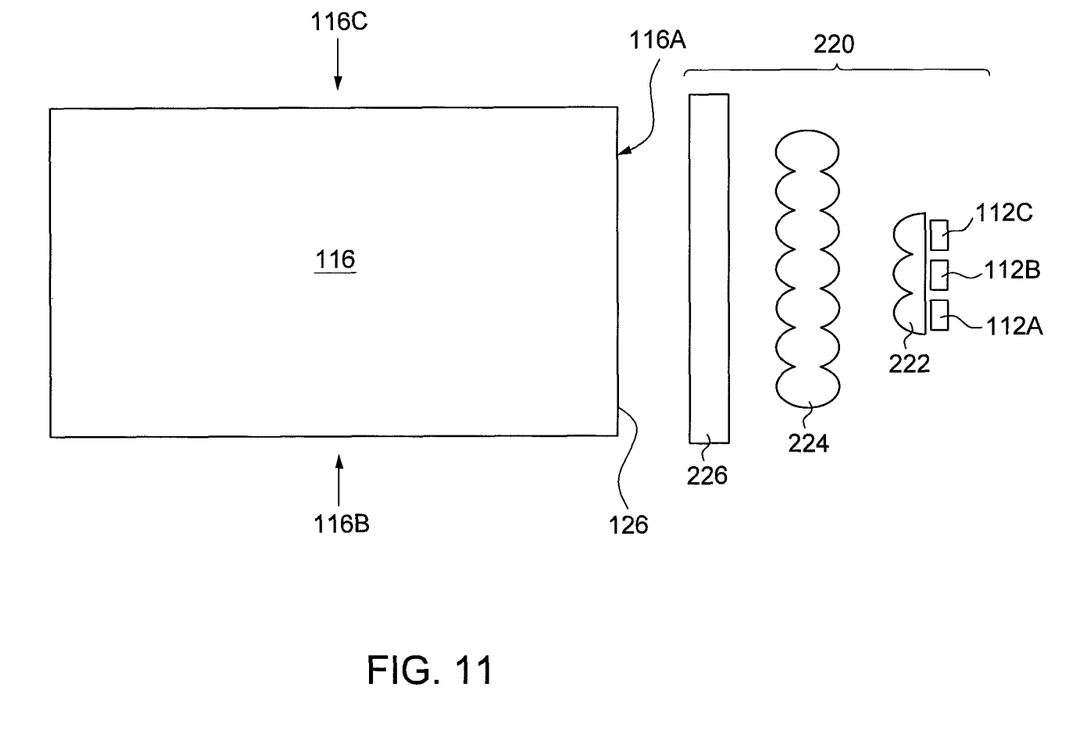
FIGS. 11-13 are simplified schematic views illustrating other embodiments of optical assemblies for delivering light emitted from multiple monochromatic light sources to the light incidence surface of a light guide plate in an imaging part of a wearable display apparatus.

FIG. 11 is a schematic view illustrating another embodiment of an optical assembly 220 for delivering light emitted from the monochromatic light sources 112A, 112B and 112C to the light incidence surface 126 of the light guide plate 116. The optical assembly 220 can include a coupling lens 222, a fly's-eye lens array 224 and a Fresnel lens 226. All of the aforementioned components of the optical assembly 220 may be arranged at the side 116A of the light guide plate 116 where is located the light incidence surface 126. Light emitted from each of the monochromatic light sources 112A, 112B and 112C can sequentially travel through the coupling lens 222, the fly's-eye lens array 224 and the Fresnel lens 226 before entering the light guide plate 116 through the light incidence surface 126.

Figure 12:
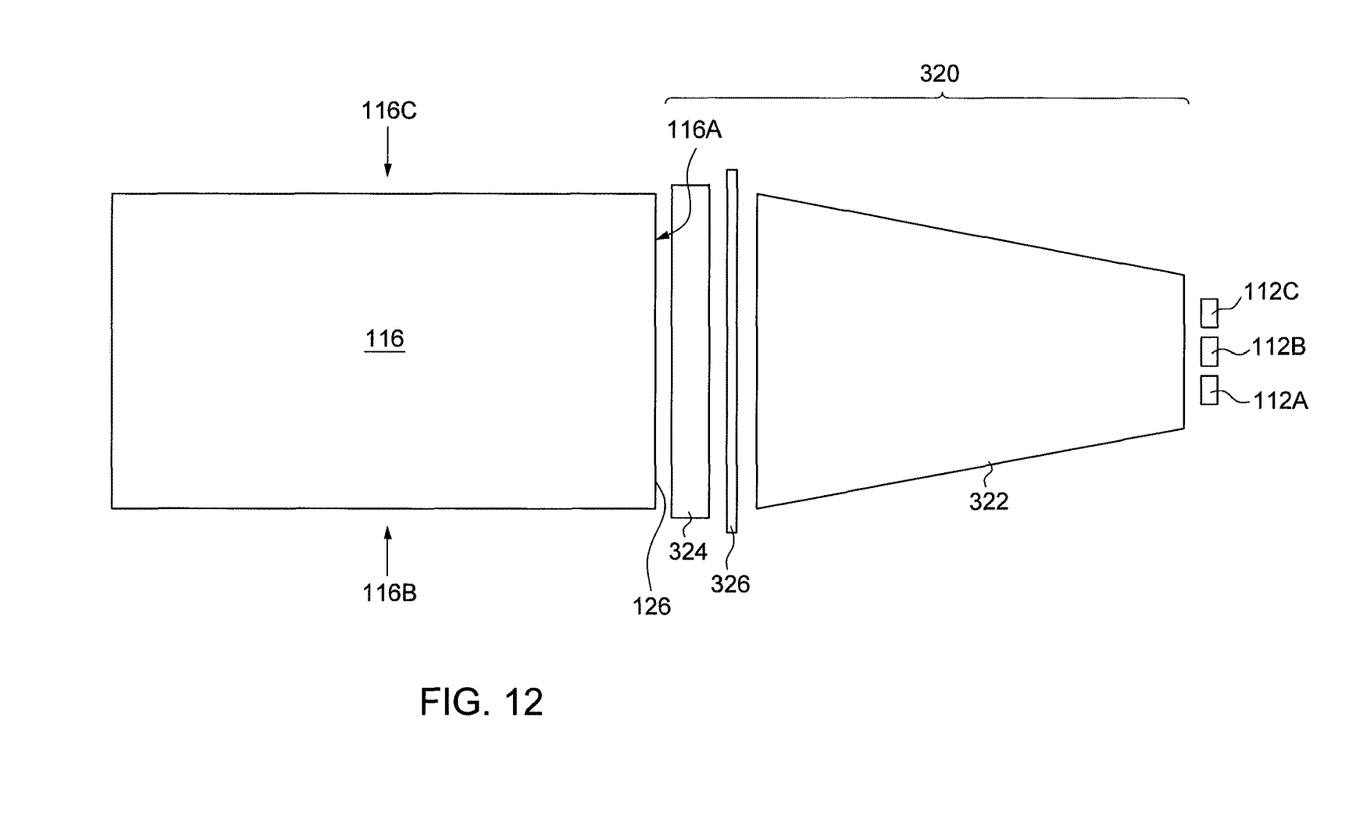

FIG. 12 is a schematic view illustrating another embodiment of an optical assembly 320 delivering light emitted from the monochromatic light sources 112A, 112B and 112C to the light incidence surface 126 of the light guide plate 116. The optical assembly 320 can include an optical integrator rod 322, a Fresnel lens 324, and a diffusing sheet 326 interposed between the optical integrator rod 322 and the Fresnel lens 324. All of the aforementioned components of the optical assembly 320 may be arranged at the side 116A of the light guide plate 116 where is located the light incidence surface 126. Light emitted from each of the monochromatic light sources 112A, 112B and 112C can sequentially travel through the optical integrator rod 322, the diffusing sheet 326 and the Fresnel lens 324 before entering the light guide plate 116 through the light incidence surface 126.

Figure 13:
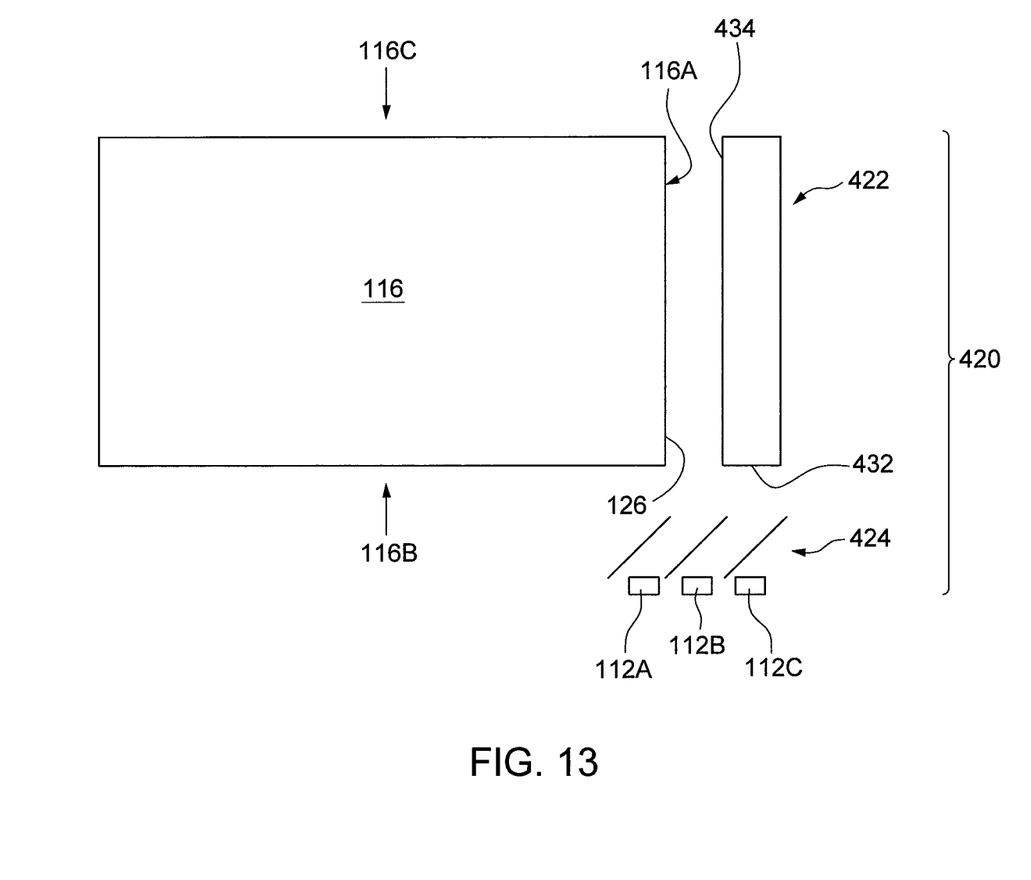

FIG. 13 is a schematic view illustrating yet another embodiment of an optical assembly 420 for delivering light emitted from the monochromatic light sources 112A, 112B and 112C to the light incidence surface 126 of the light guide plate 116. The optical assembly 420 can include a light guide member 422 and a plurality of dichroic mirrors 424. The light guide member 422 can exemplary have a structure similar to the light guide member 132 described previously. The light guide member 422 can be arranged such that a light entering surface 432 of the light guide member 422 faces the dichroic mirrors 424, and a major surface 434 of the light guide member 422 contiguous to the light entering surface 432 faces the light incidence surface 126 of the light guide plate 116. The dichroic mirrors 424 can direct light emitted from the monochromatic light sources 112A, 112B and 112C toward the light entering surface 432 of the light guide member 422, which can then distribute the light across the light incidence surface 126 of the light guide plate 116.

Advantages of the structures described herein include the ability to provide a wearable display apparatus that can exhibit vivid color, high contrast and high resolution. Moreover, the wearable display apparatus described herein includes an optical assembly that can uniformly distribute light emitted from multiple spatially distinct monochromatic light sources of different colors, so that the light modulator can be illuminated with uniform luminosity by each color light.

Realizations of the embodiments of the wearable display apparatus have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A wearable display apparatus comprising:
   a reflective light modulator having a front;
   a light guide plate placed at the front of the light modulator, the light guide plate having a first and a second major surface opposite to each other, and a light incidence surface connected with the first and second major surfaces, the light guide plate being configured to direct light received at the light incidence surface through the first major surface toward the light modulator for modulation;
   a plurality of monochromatic light sources of different colors, the monochromatic light sources being operable to emit light of the different colors in a sequential manner; and
   an optical assembly arranged adjacent to the light incidence surface of the light guide plate, the optical assembly being configured to homogenize and distribute the light emitted by each of the monochromatic light sources across the light incidence surface, wherein the optical assembly includes an optical integrator rod having an interior delimited by a plurality of reflective sidewalls, and a light guide member arranged along the light incidence surface of the light guide plate, the light guide member having a third and a fourth major surface opposite to each other that extend between a first and a second end of the light guide member, the third major surface being oriented toward the light incidence surface of the light guide plate;
   wherein the light from each of the monochromatic light sources undergoes internal reflection while propagating through the optical integrator rod, enters the light guide member via a light entering surface on the first end of the light guide member and exits the light guide member through the third major surface thereof.

2. The wearable display apparatus according to claim 1, wherein the light incidence surface is provided on a first side of the light guide plate, and the optical integrator rod generally extends along a second side of the light guide plate that is contiguous to the first side, the optical integrator rod having a light entrance window, a light exit window, and an elongated portion extending along an axis, the light entrance window being defined at an end of the elongated portion, and the light exit window opening on a side of the elongated portion at a location distant from the light entrance window along the axis.

3. The wearable display apparatus according to claim 2, wherein the elongated portion extends along a first axis, and the optical integrator rod further includes a turn portion for directing light toward the light exit window, the turn portion extending along a second axis tilted an angle between about 40 degrees and about 50 degrees relative to the first axis.

4. The wearable display apparatus according to claim 2, wherein the light entrance window and the light exit window have respective cross-sections of different shapes.

5. The wearable display apparatus according to claim 1, wherein the light guide member further includes a plurality of optical structures configured to redirect light toward the third major surface.

6. The wearable display apparatus according to claim 5, wherein the optical structures include a plurality of grooves formed on the fourth major surface of the light guide member, each of the grooves having a reference axis that is orthogonal to the fourth major surface, and a first and a second sidewall that extend at two sides of the reference axis, a first angle defined between the first sidewall and the reference axis being between about 30 and about 65 degrees, and a second angle defined between the second sidewall and the reference axis being between about 0 and about 30 degrees.

7. The wearable display apparatus according to claim 1, wherein the light guide member has a shape that tapers toward the second end.

8. A wearable display apparatus comprising:
   a reflective light modulator having a front;
   a light guide plate placed at the front of the light modulator, the light guide plate having a first and a second major surface opposite to each other, and a light incidence surface connected with the first and second major surfaces, the light guide plate being configured to direct light received at the light incidence surface through the first major surface toward the light modulator for modulation;
   a plurality of monochromatic light sources of different colors, the monochromatic light sources being operable to emit light of the different colors in a sequential manner; and
   an optical assembly arranged adjacent to the light incidence surface of the light guide plate, the optical assembly being configured to homogenize and distribute the light emitted by each of the monochromatic light sources across the light incidence surface;
   wherein the optical assembly includes an optical integrator rod, a light guide member, and a diffusing sheet arranged between the optical integrator rod and the light guide member, the light emitted from each of the monochromatic light sources sequentially travels through the optical integrator rod, the diffusing sheet and the light guide member, the light guide member directing the light toward the light incidence surface of the light guide plate.

9. The wearable display apparatus according to claim 8, wherein the optical assembly further includes a reflective polarizer arranged between the light guide member and the light incidence surface.

10. The wearable display apparatus according to claim 8, wherein the light guide plate has a first side where is provided the light incidence surface, and a second side contiguous to the first side, the light guide member generally extending along the first side of the light guide plate, and the optical integrator rod generally extending along the second side of the light guide plate.

11. A wearable display apparatus comprising:
a reflective light modulator having a front;
a light guide plate placed at the front of the light modulator, the light guide plate having a first and a second major surface opposite to each other, and a light incidence surface connected with the first and second major surfaces, the light guide plate being configured to direct light received at the light incidence surface through the first major surface toward the light modulator for modulation;
a plurality of monochromatic light sources of different colors, the monochromatic light sources being operable to emit light of the different colors in a sequential manner; and
an optical assembly arranged adjacent to the light incidence surface of the light guide plate, the optical assembly being configured to homogenize and distribute the light emitted by each of the monochromatic light sources across the light incidence surface;
wherein the light guide plate has a first side where is provided the light incidence surface, and a second and a third side opposite to each other that are contiguous to the first side, and the monochromatic light sources of different colors include a plurality of first monochromatic light sources and a plurality of second monochromatic light sources respectively arranged at the second and third side of the light guide plate;
wherein the optical assembly includes a first and a second optical integrator rod, a light guide member, and a first and a second diffusing sheet respectively interposed between the light guide member and the first and second optical integrator rods, light emitted from each of the first monochromatic light sources traveling through the first optical integrator rod and the first diffusing sheet and being redirected by the light guide member toward the light incidence surface of the light guide plate, and light emitted from each of the second monochromatic light sources traveling through the second optical integrator rod and the second diffusing sheet and being redirected by the light guide member toward the light incidence surface of the light guide plate.

12. The wearable display apparatus according to claim 10, wherein the light guide member extends along the first side of the light guide plate, and the first and second optical integrator rods respectively extend along the second and third side of the light guide plate.

13. The wearable display apparatus according to claim 11, wherein the light guide member has a third and a fourth major surface opposite to each other, and a plurality of optical structures configured to redirect light toward the third major surface, the third major surface being oriented toward the light incidence surface of the light guide plate.

14. The wearable display apparatus according to claim 13, wherein the optical structures include a plurality of grooves formed on the fourth major surface of the light guide member, each of the grooves having a reference axis that is orthogonal to the fourth major surface, and a first and a second sidewall that extend at two sides of the reference axis, each of a first angle defined between the first sidewall and the reference axis and a second angle defined between the second sidewall and the reference axis being between about 30 and about 65 degrees.

15. A wearable display apparatus comprising:
a reflective light modulator having a front;
a light guide plate placed at the front of the light modulator, the light guide plate having a first and a second major surface opposite to each other, and a light incidence surface connected with the first and second major surfaces, the light guide plate being configured to direct light received at the light incidence surface through the first major surface toward the light modulator for modulation;
a plurality of monochromatic light sources of different colors, the monochromatic light sources being operable to emit light of the different colors in a sequential manner; and
an optical assembly arranged adjacent to the light incidence surface of the light guide plate, the optical assembly being configured to homogenize and distribute the light emitted by each of the monochromatic light sources across the light incidence surface;
wherein the optical assembly includes an optical integrator rod, a Fresnel lens, and a diffusing sheet interposed between the optical integrator rod and the Fresnel lens, light emitted from each of the monochromatic light sources sequentially traveling through the optical integrator rod, the diffusing sheet and the Fresnel lens before entering the light guide plate through the light incidence surface.

* * * * *